United States Patent
Finocchio (10) Patent No.: US 7,171,648 B1
(45) Date of Patent: Jan. 30, 2007

(54) SYSTEM AND METHOD FOR IMPLEMENTING OBJECT PROPERTY GROUPING

(75) Inventor: Mark J. Finocchio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/001,635

(22) Filed: Oct. 30, 2001

Related U.S. Application Data (60) Provisional application No. 60/244,290, filed on Oct. 30, 2000.

(51) Int. Cl.
G06F 9/44 (2006.01)
G09G 3/20 (2006.01)
(52) U.S. Cl. .................. 717/110; 717/105; 345/581
(58) Field of Classification Search ........ 717/100–122; 707/102–103; 345/87
See application file for complete search history.

(56) References Cited

U.S. PATENT DOCUMENTS

| 5,784,037 | A  | * | 7/1998  | Inoue .......................... 345/87 |
| 6,374,252 | B1 | * | 4/2002  | Althoff et al. .............. 707/102 |
| 6,453,324 | B1 | * | 9/2002  | Baisley et al. .............. 707/203 |
| 6,463,442 | B1 | * | 10/2002 | Bent et al. .............. 707/103 R |
| 6,499,062 | B1 | * | 12/2002 | Shteyn ....................... 719/315 |

\* cited by examiner

*Primary Examiner*—Tuan Dam
*Assistant Examiner*—Chuck Kendall
(74) *Attorney, Agent, or Firm*—Christensen O'Connor Johnson Kindness PLLC (57) ABSTRACT

A method and system for processing object property changes are provided. A request to process at least one object property is obtained and a property change defer cycle is started. The object property change is grouped into one or more object property change groups. In the event the object property groups implementation creates additional property changes, the additional property changes are grouped and then implemented. The property change defer cycle is terminated and the object property groupings are implemented.

34 Claims, 9 Drawing Sheets

```
<STYLE>
    BUTTON
    {
        BORDERSTYLE: RAISED;
    }
    BUTTON [PRESSED]
    {
        BORDERSTYLE: SUNKEN;
    }
</STYLE>
```

| PROPERTY | GROUP |
|----------|-------|
| A | G0 |
| B | G1 |
| C | G1 |
| D | G0 |
| E | G2 |

SYSTEM AND METHOD FOR IMPLEMENTING OBJECT PROPERTY GROUPING

CROSS-REFERENCE TO RELATED APPLICATION

This application claims the benefit of U.S. Provisional Application No. 60/244,290, entitled METHOD AND SYSTEM FOR IMPLEMENTING PROPERTY GROUPING, filed Oct. 30, 2000. U.S. Provisional Application No. 60/244,290 is incorporated by reference herein.

FIELD OF THE INVENTION

In general, the present invention relates to computer software, and in particular, to a method and system for grouping object property changes and implementing the changes upon completion of the property change defer cycle.

BACKGROUND OF THE INVENTION

Generally described, computer devices, such as personal computing devices ("PCs"), computing terminals, hand-held computers, mobile devices, and the like, provide a user with a variety of data processing functions. By utilizing various software applications resident on a computing device, the computing device can allow a user to communicate with other computing devices, to access information via a computer network, and/or to process data. To better facilitate interaction with a user, or group of users, the software applications can generates one or more user interfaces that are displayed on a computer display and interact with the user.

In one approach to a user interface, the user interface is limited to a text-based interface, in which a user manually enters commands to the software application via a computer keyboard. Text-based interfaces are inefficient, however, because they typically require the user to learn, and often memorize, a command language. Moreover, text-based interfaces require a user to be efficient in manipulating a keyboard. Another approach to a user interface involves a combination of graphical icons and text, which is generally referred to as a graphical user interface ("GUI").

In one GUI embodiment, a software application being executed by the computing device generates instructions to a computer device operating system that results in the display of graphical images and text, such as icons, images, colors, and animation, within a rectangular window displayed on the computer display. A user can interact with the software application by manipulating the GUI with a selection device, such as a computer mouse or a touch-screen. Often, the user is not required to memorize any textual commands and many GUIs share common interface functionality. For example, any number of software applications may utilize the same graphical icon depicting a computer printer to allow a user to print material by manipulating the printer graphical icon. As the user manipulates the GUI, the user's actions are interpreted by the computing device operating system and relayed to the corresponding software application. The user's action can result in a modification of the GUI, such as the depression of a button icon, and can further result in the initiation of an action by either the operating system and/or the software application.

One skilled in the relevant art will appreciate that a GUI can be represented in terms of a rich user interface programming framework that includes instances of a number of user interface objects ("UI object"), such as a display object. In turn, each instance of a UI object can be defined by various object characteristics, which are represented in the UI as UI object properties. For example, a GUI may include a number of identical UI objects, such as a graphical button that can be depressed by manipulating a mouse. However, each instance of the UI button object in the GUI may be defined as having specific, and often distinguishing property values, such as dimension, color, opacity, and the like. Accordingly, the UI object is defined, and represented on the computer display by the operating system, in terms of its characteristic property values (e.g., large, red, 50%).

In a dynamic GUI, one or more of the property values for a UI object may change. For example, a software application may specify a dimension and color for a UI object if the user is manipulating the object and another dimension and color if the user is not manipulating the object. Accordingly, if a manipulation is detected, the software application issues a property change notification to the computing device operating system indicating the new property values for the UI object. In a typical dynamic GUI processing method, each property change notification generated by a software application causes the operating system to regenerate at least part of the display associated with the software application. In some instances, the notification can cause the operating system to regenerate the entire computing device display.

One skilled in the relevant art will appreciate that some operating system actions, such as regenerating the display, are work intensive and can consume a great deal of the system resources, such as processing resources. In addition to the property change notifications caused as a direct result of a manipulation event, a first property change and screen regeneration may cause additional property changes in other UI objects and require additional display regenerations. For example, a first UI object property change that modifies the dimensions of a UI object can effect the dimension properties of a number of adjacent UI objects. Under a conventionally configured dynamic GUI processing system, the operating system would potentially have to perform a series of display regenerations as an indirect result of the initial screen regeneration to modify the first UI object dimension property. Thus, continuous regeneration of the display by the operating system degrades the computing device's performance and diminishes the ability for the computing device to process additional system functions.

Thus, there is a need for a method and system for grouping and implementing UI object property changes to mitigate the number of continuous display regenerations in a computing device.

SUMMARY OF THE INVENTION

A method and system for processing object property changes are provided. A request to process at least one object property is obtained and a property change defer cycle is started. The object property change is grouped into one or more object property change groups. In the event the object property groups implementation creates additional property changes, the additional property changes are grouped and then implemented. The property change defer cycle is terminated and the object property groupings are implemented.

In accordance with an aspect of the present invention, a method for processing object property changes is provided. An operating environment obtains a request to process at least one object property change corresponding to a software application object. The operating environment initiates a property change defer cycle and processes the object property change. The operating environment determines the end of the property change defer cycle and implements the processed at least one object property change upon the determination of the end of the property change defer cycle.

In accordance with another aspect of the present invention, a method for processing display object property changes in a computer system having a display, a memory including at least one software application, and an operating environment is provided. An operating environment obtains a request from the software application to process at least one object property change corresponding to a display object associated with the software application. The operating environment initiates a first property change defer cycle and associates a property change group category to the at least one object property change. The operating environment then identifies additional display object property changes corresponding to the implementation of the at least one object property change.

The operating environment initiates a second property change defer cycle and processes any additional property changes corresponding to the implementation of the at least one object property change. The operating environment determines the end of the second property change defer cycle and then determines the end of the first property change defer cycle. The operating environment then implements the processed property changes upon the determination of the end of the first property change defer cycle.

In accordance with a further aspect of the present invention, a method for processing object property changes is provided. An operating environment obtains a request to process at least one object property change corresponding to a software application object and initiates a first property change defer cycle. The operating environment generates a property change group memory array that includes array elements corresponding to an object associated with the property change request. The operating environment then populates the property change group memory array with a property change group category associated with the at least one object property change. For each memory array element, the operating environment identifies additional display object property changes corresponding to the implementation of the at least one object property change.

The operating environment initiates a second property change defer cycle and processes any additional property changes corresponding to the implementation of the at least one object property change. The operating environment then determines the end of the second property change defer cycle and the end of the first property change defer cycle. Finally, the operating environment implements the processed object property change upon the determination of the end of the first property change defer cycle.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 15:
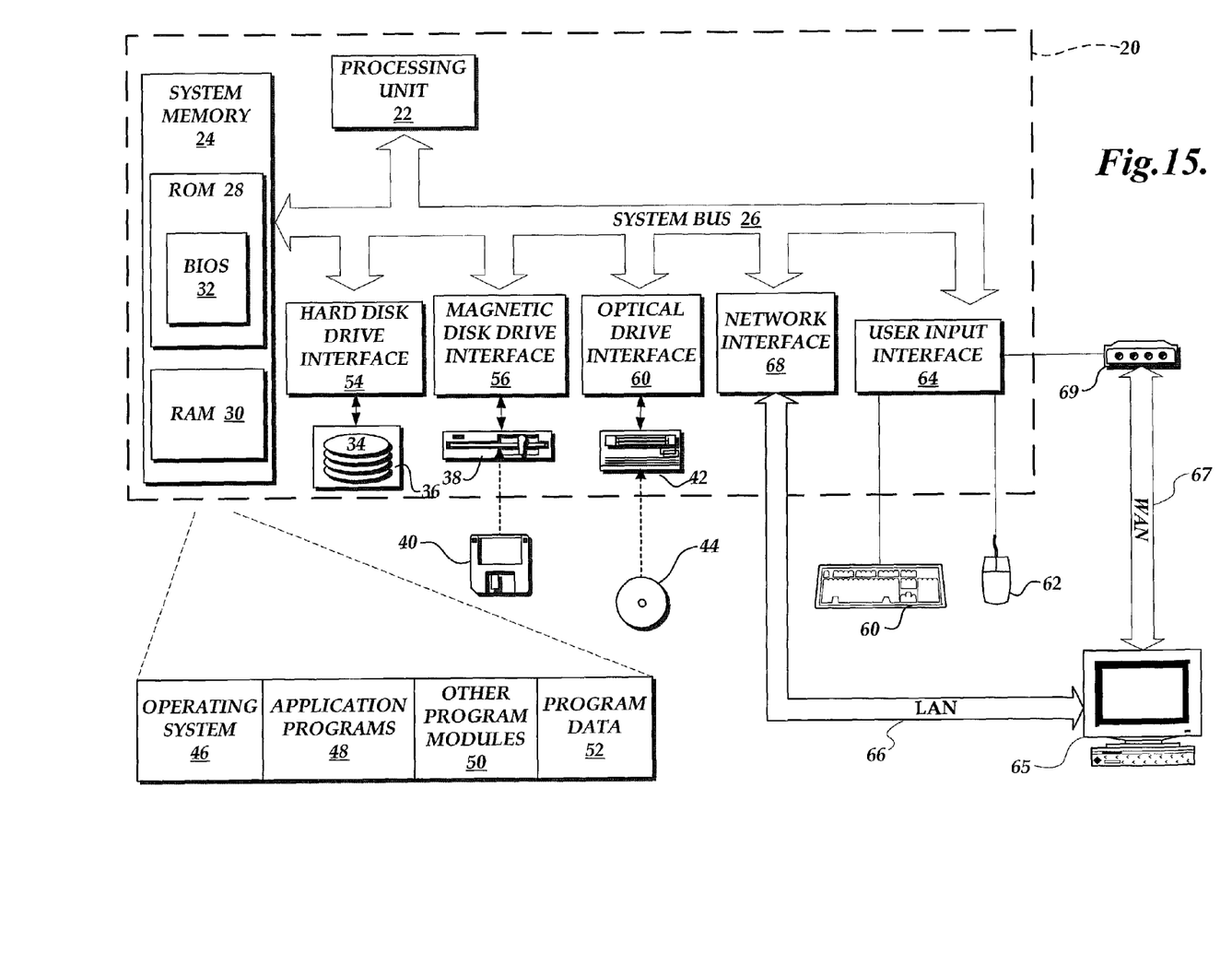
FIG. 15 is a block diagram of a computer system suitable for implementing the present invention.

FIG. 15 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purposes such as well known computing systems, environments, and/or configurations. Example of such that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 15, an exemplary system for implementing the invention includes a general purpose-computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 15 illustrates an operating system 46, application programs 48, other program modules 50, and program data 52.

The computer 20 may also include removable/non-removable, volatile/non-volatile computer storage media. By way of example only, FIG. 15 illustrates a hard disk drive 34 that reads from or writes to non-removable, non-volatile magnetic media 36, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 57, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associated computer storage media discussed above and illustrated in FIG. 15, provide storage of computer-readable instructions, data structures, program modules and other data for the computer 20. In FIG. 15, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 15. The logical connections depicted in FIG. 15 include a local area network (LAN) 66 and a wide area network (WAN) 67, but also include other networks. Such network environments are commonplace in office, enterprise-wide computer networks, Intranets, and the Internet. One skilled in the relevant art will appreciate that the computer 20 may be configured such that at least one network connection is non-continuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 66 through a network interface adapter 68. When used in a WAN network environment, the computer typically includes a modem or other means for establishing communications over the WAN 67, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 15 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to load the operating system from the hard disk drive 34 into the RAM 30. Once the operating system 46 is loaded into RAM 30, the processing unit executes the operating system code and causes the visual elements associated with the user interface of the operating system to be displayed on a monitor. When a user opens an application program 48, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various ways (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise a WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present application is directed toward a method and system for grouping object property changes and implementing any object property changes. More specifically, the present invention will be described in relation to a system and method for grouping declarative UI object property changes and implementing the UI object changes through the utilization of a property change defer cycle. As will be readily understood by one skilled in the relevant art, the present invention is not limited in its application to a declarative UI. Thus, it is to be understood that the disclosed embodiment is only by way of example and should not be construed as limiting.

In accordance with the present invention, a software application program 48 can instantiate various UI display objects by specifying various attribute values for the UI display objects and transmitting the definition of the UI object to the operating system 46. Additionally, other components, including components of the operating system 46 may define UI objects to be displayed. In turn, the operating system 46 can manipulate a number of hardware devices to generate the UI objects on the computer display. In one embodiment of the present invention, software applications 48 resident on the system memory 24 can instantiate UI objects for display through the use of a markup language conforming to the standard generalized markup language ("SGML") format, such as the extensible markup language ("XML"). In accordance with this embodiment, each software application program 48 may generate XML instance data specifying displaying properties conforming to a cascading style sheet ("CSS") or Level 2 cascading style sheet ("CSS2"). One skilled in the relevant art will appreciate that the XML instance data generated by the software application program may utilize a base XML schema defined by the operating system or an extended XML schema in specifying the attribute values. Still further, one skilled in the relevant art will appreciate that the software application 48 is not limited to utilizing XML instance data or variations of a cascading style sheet.

Figure 1:
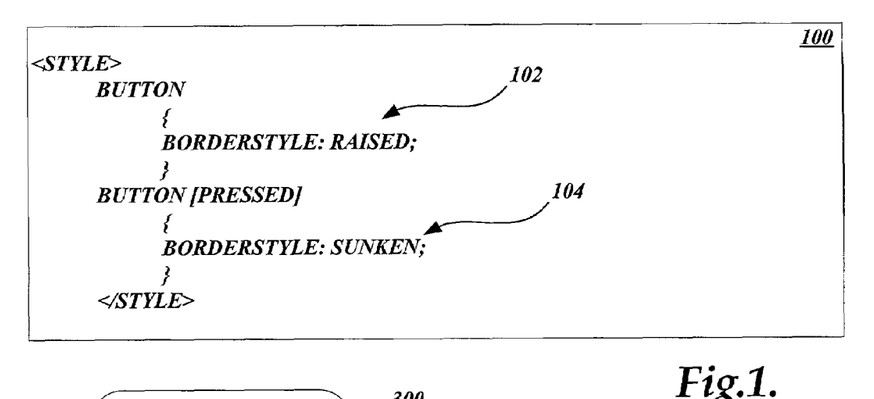
FIG. 1 is a block diagram of data utilized to instigate a property change in accordance with the present invention.

FIG. 1 is a block diagram illustrative of XML instance data 100 specifying attribute values for a UI object in accordance with the present invention. In accordance with this illustrative embodiment, the XML instance data 100 relates to defining display attribute values for a specific UI object, namely, a "BUTTON" object generated for the software application program 48. The XML instance data 100 includes a first portion 102 for specifying a "raised" attribute value for the "borderstyle" attribute of the "Button" class. Additionally, the XML instance data 100 includes a second portion 104 for specifying a "sunken" attribute value for the "borderstyle" attribute if an attribute "selector" is at a "pressed" value. The XML instance data 100 specifies values for the "borderstyle" attribute that are conditional upon another whether the BUTTON UI object has a "pressed" attribute value. Thus, the operating system 46 would be instructed to display the borderstyle of the BUTTON object as "raised" if the BUTTON has not been pressed, and "sunken" if the BUTTON has been pressed.

One skilled in the relevant art will appreciate that an software application program 48 may pass XML instance data, either as a single transmission or multiple transmissions, specifying conditional attribute properties for any number of UI object properties. Because some, or all, of a UI object's property attributes may be dependent on other UI objects such that a single UI object may be associated with a series of property changes, in accordance with present invention, the operating system 46 enters into a object property change defer cycle. Throughout the object property change defer cycle, the operating system 46 groups similar UI object property changes such that property changes can be processed collectively. As certain group property changes are processed, any subsequent property changes that would result from the implementation of the initial grouped property changes are also grouped for processing. Accordingly, the operating system 46 may enter into one or more embedded property change defer cycles. At the end of the original property change defer cycle, the grouped property changes are implemented collectively to mitigate the drain on system processing resources. In accordance with an illustrative embodiment of the present invention, the end of the property change defer cycle may be specified by the software application program 48 by the completion of a list of tasks, after a pre-determined amount of processing time, and/or after a threshold number of property changes have been implemented.

Figure 2:
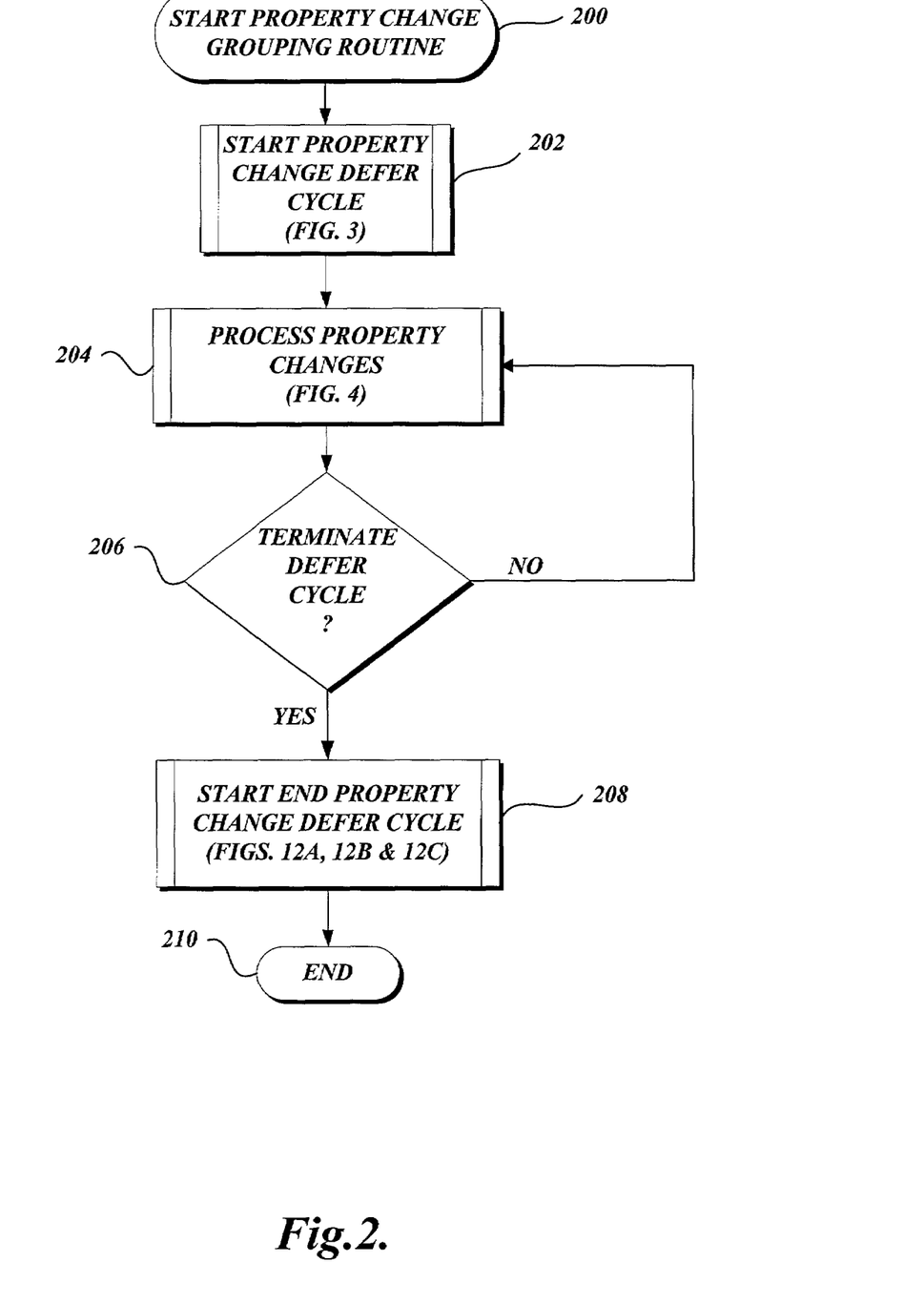
FIG. 2 is a flow diagram of a property change grouping routine in accordance with the present invention.
Figure 3:
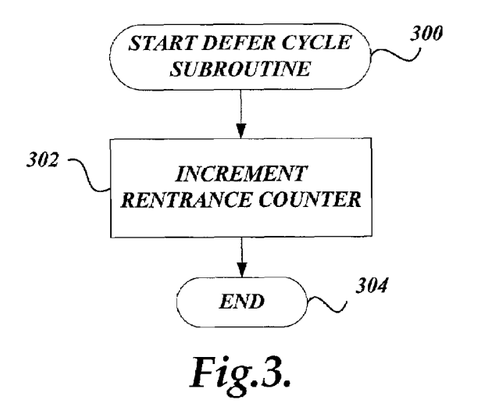
FIG. 3 is a flow diagram of a start property change defer cycle sub-routine in accordance with the present invention.

FIG. 2 is flow diagram illustrative of a property change grouping routine 200 implemented by the operating system 46 in accordance with the present invention. In accordance with the present invention, the property change grouping routine 200 can be initiated by the operating system 46 by the receipt of a property change notification issued by the software application program 48. At block 202, the routine 200 enters a start property change defer cycle sub-routine. FIG. 3 is a flow diagram illustrative of a start property change defer cycle sub-routine 300 in accordance with the present invention. At block 302, a reentrant counter is incremented. In an illustrative embodiment, the first time the sub-routine is entered, the reentrant counter is set to "0" and incremented to a value of "1". As will be explained in greater detail below, in accordance with the present invention, the operating system 46 may enter into a number of additional, embedded property change defer cycles. Thus, each time the sub-routine 300 is called again, the reentrant counter will be further incremented. At block 304, the sub-routine 300 returns.

Figure 4:
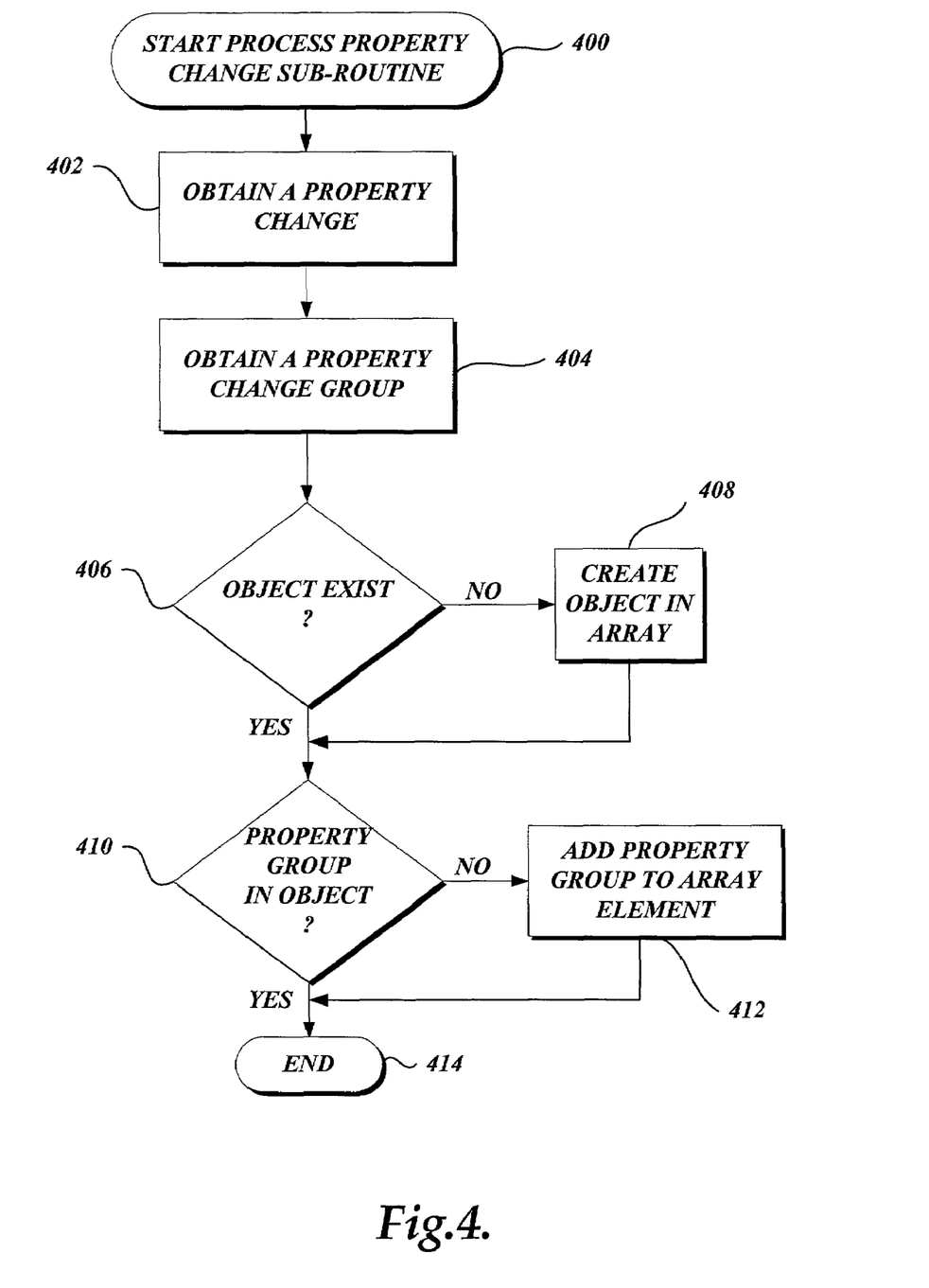
FIG. 4 is a flow diagram of a property change processing sub-routine in accordance with the present invention.

Returning to FIG. 2, at block 204, the current property change is processed. FIG. 4 is a flow diagram illustrative of a current property change processing sub-routine 400 implemented by the operating system 46 in accordance with the present invention. At block 402, a list of current object property changes is obtained. In an illustrative embodiment of the present invention, the operating system 46 may receiving one or more notifications for changing the various properties of one or more UI objects. Thus, the list can include multiple entries for a single UI object, specifying the change in any number of properties.

Table (1) illustrates a list of object property changes will be utilized to illustrate the property change processing sub-routine 400. In table (1), each identifiable object is represented as a numeral and each identifiable property of an object is represented by a letter. Accordingly, the combination of a numeral and letter identifies the current property change. However, one skilled in the relevant art will appreciate that table (1) is illustrative in nature and should not be construed as limiting.

| Object | Property Changed |
|---|---|
| 0 | B |
| 2 | C |
| 1 | E |
| 0 | D |
| 2 | B |
| 3 | A |
| 1 | A |

Figure 5:
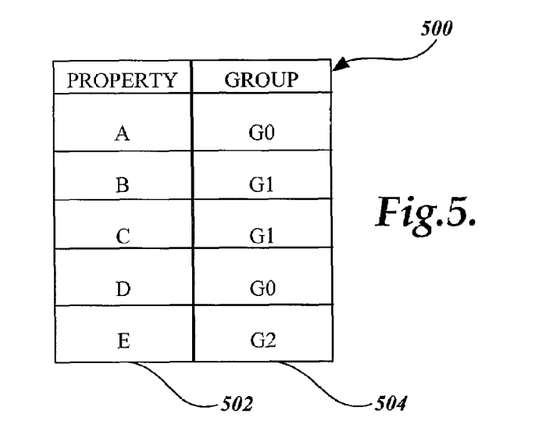
FIG. 5 is a block diagram of a property change-grouping table formed in accordance with the present invention.

In the illustrative embodiment, the first property change in the obtained by the operating system 46 would be a change in object property 0B. At block 404, the operating system 46 obtains an object property group category corresponding to the current object property change. FIG. 5 is a block diagram illustrative of a table 500 correlating a column of object properties 502 to a column of object property group categories 504. With reference to FIG. 5, a change in property "A", irrespective of what object, corresponds to group "G0". Similarly, a change to property "C" corresponds to group "G1." However, in accordance with the present invention, the correlation between an object property and a group category is not exclusively one-to-one such that a single property can correspond to no property groups or to multiple property groups. Similarly, two or more properties can correspond to the same property group. In an actual embodiment of the present invention, the property and property group selections may be pre-selected on the basis of processing efficiencies and identifiable relationships. Additionally, the property group table 500 may be dynamically generated, or updated, throughout the executing of sub-routine 400.

Figure 6:
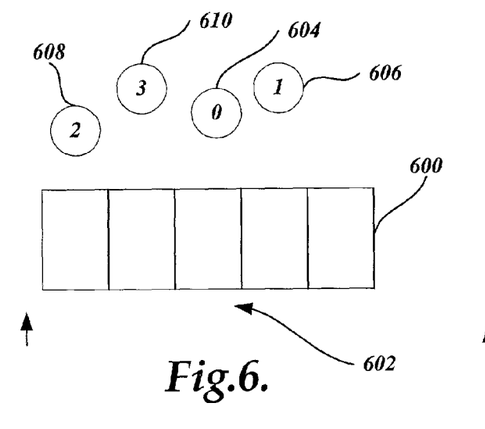
FIG. 6 is a block diagram of a memory array containing the property groupings for each object in accordance with the present invention.

With reference to the illustrative embodiment, the first property change in involves the "B" property of the "0" object and therefore corresponds to property group "G1." Returning to FIG. 4, at block 406, a test is conducted to determine whether the object corresponding to the current object property change has previously been designated for a property change in the property change defer cycle. In accordance with an actual embodiment of the present invention, the operating system 46 maintains a memory queue, or array, utilized to store all property changes for an object during the property change defer cycle. FIG. 6 is a block diagram of memory array 600 that may be utilized to store the property change groupings. The memory array 600 can include any number of array elements 602 that correspond to the UI objects, illustrated as 604, 606, 608, and 610. As will be explained in greater detail below, the memory array 600 can include more than one array element 602 corresponding to the same UI object.

Figure 7:
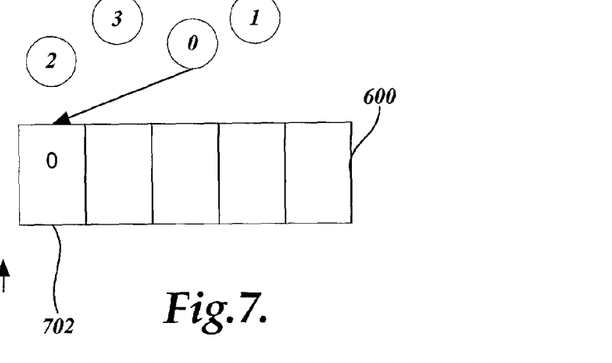
FIG. 7 is a block diagram of the memory array of FIG. 6 illustrating the population of the memory array in accordance with the present invention.

If the object does not correspond to an existing array element 602 in the array 600, at block 408, an array element 602 is created to correspond to the object. With reference to the illustrative example of table (1), FIG. 7 is a block diagram of the memory array 600 of FIG. 6 illustrative of the creation a memory array element 702 corresponding to the object "0."

Returning to FIG. 4, once the memory array element has been created at block 408 or if a memory array element exists at decision block 406, at decision block 410 a test is conducted to determine whether the property grouping corresponding to the object is listed in the memory element corresponding to the object. In an illustrative embodiment of the present invention, property group categories can incorporate the implementation of various properties. Thus, once a property group category is designated, additional work (in relation to property changes belonging to the same property group category) will be done at one time. For example, property group designations may be represented by a bit mask such that once the bit mask is set to indicate work is to be done in the specific property group category, all pending work functions will be performed for the property group category.

Figure 8:
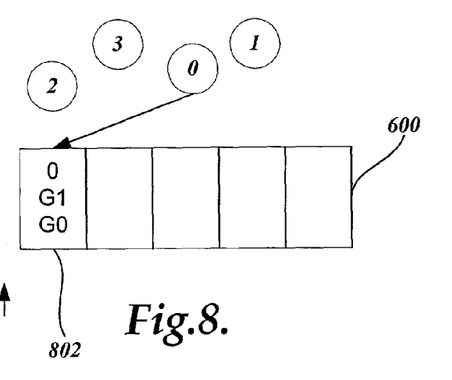
FIG. 8 is a block diagram of the memory array of FIG. 6 illustrating the population of the memory array in accordance with the present invention.

If the array element corresponding to the designated property does not contain reference to the property category corresponding to the object property change, at block 412, the property grouping is added to the memory array. FIG. 8 further illustrates the population of the property group category "G0" for the "0" object in array element 802. Returning to FIG. 4, the property grouping already exists in the memory array 600 or once the property grouping has been added at block 412, at block 414, the current property change has been processed and the sub-routine 400 returns to routine 200.

Returning to FIG. 2, at decision block 206, a test is done to determine whether the end of the property change defer cycle has been reached. In an actual embodiment of the present invention, the software application program 48 instructs the operating system 46 when the property change defer cycle is to terminate. Alternatively, the operating system 46 may continue the property change defer cycle for a specified period of time or until a certain number of property changes have been implemented. If the end of the property change defer cycle has not been reached, the routine 200 returns to block 204 to process additional property changes.

Figure 9:
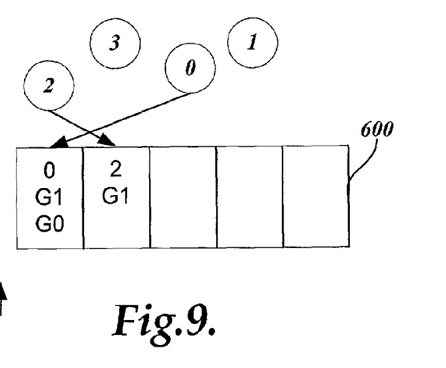
FIG. 9 is a block diagram of the memory array of FIG. 6 illustrating the population of the memory array in accordance with the present invention.
Figure 10:
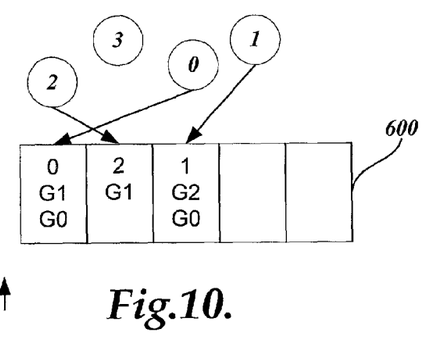
FIG. 10 is a block diagram of the memory array of FIG. 6 illustrating the population of the memory array in accordance with the present invention.
Figure 11:
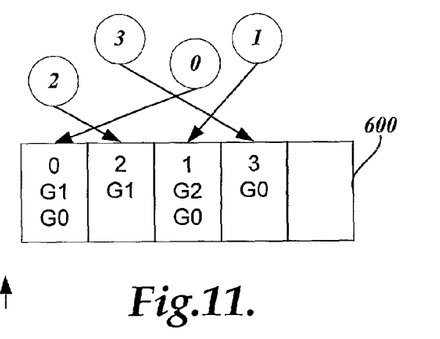
FIG. 11 is a block diagram of the memory array of FIG. 6 illustrating the population of the memory array in accordance with the present invention.

FIGS. 9, 10 and 11 are block diagrams of the memory array 600 of FIG. 6 illustrating the population of the memory array with the object property changes illustrated in table (1). In an illustrative embodiment of the present invention, the order of the object properties in the array elements does not matter as illustrated in FIGS. 6–11. Further, the array elements may be populated by any number of object property group categories.

Figure 12A:
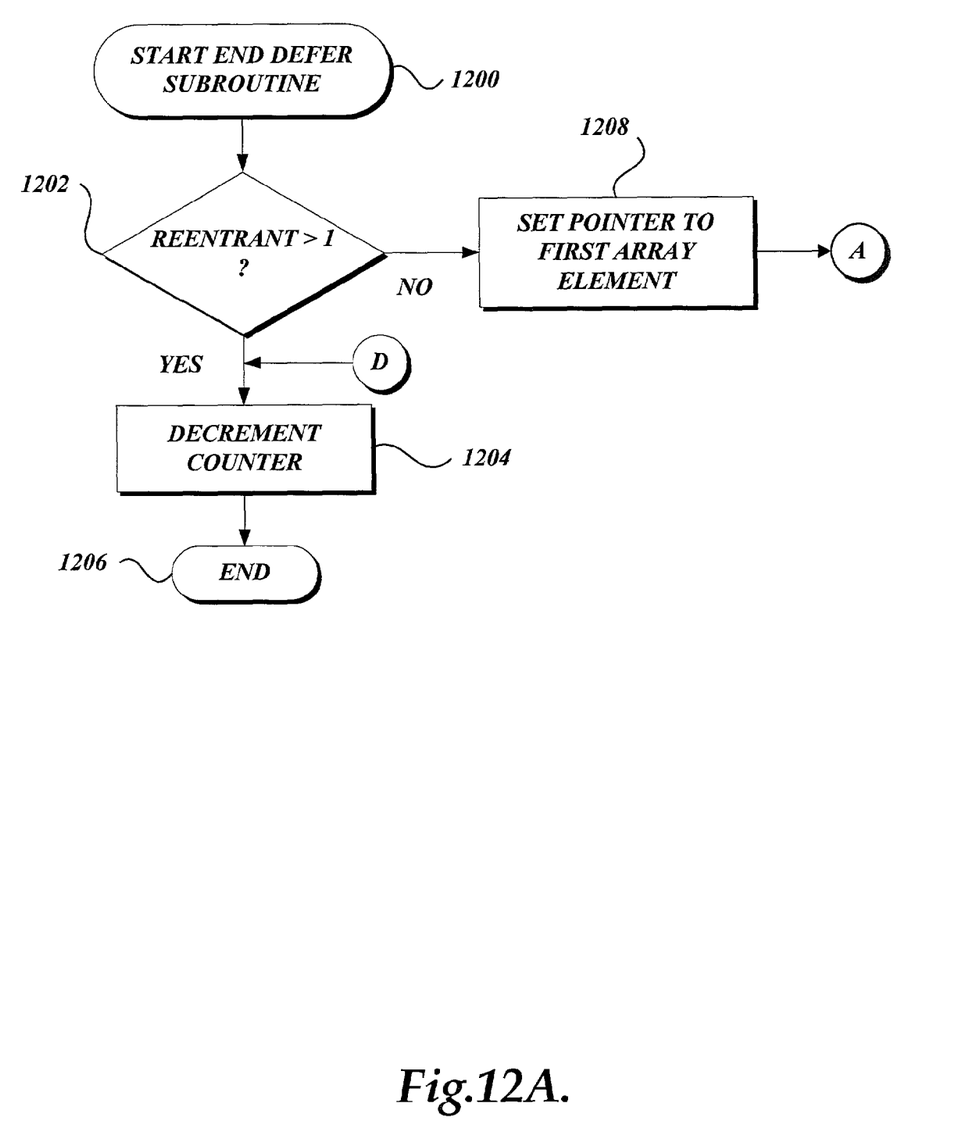
FIGS. 12A, 12B, 12C are flow diagrams of an end property change defer cycle sub-routine in accordance with the present invention.
Figure 12B:
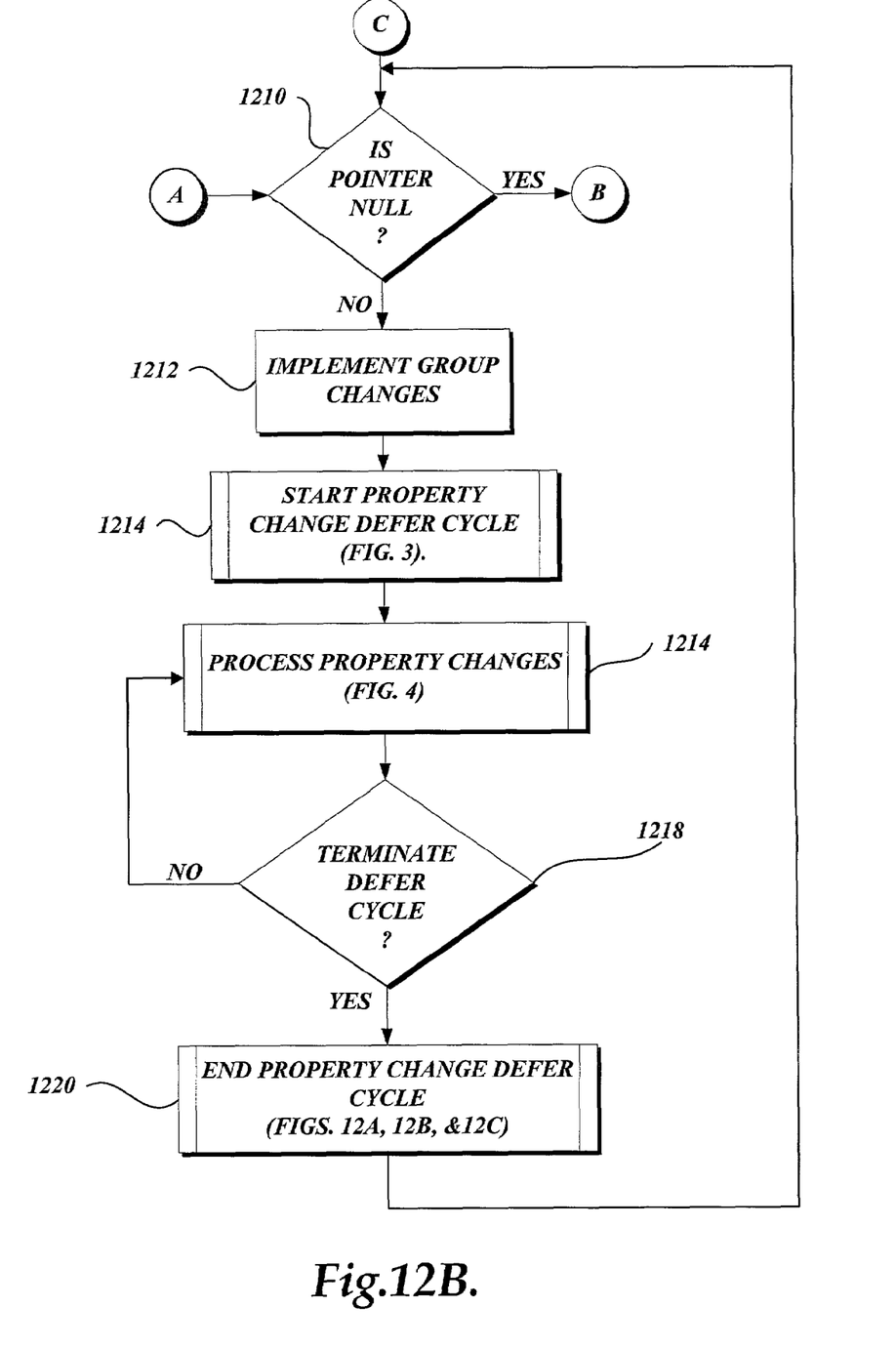
Figure 12C:
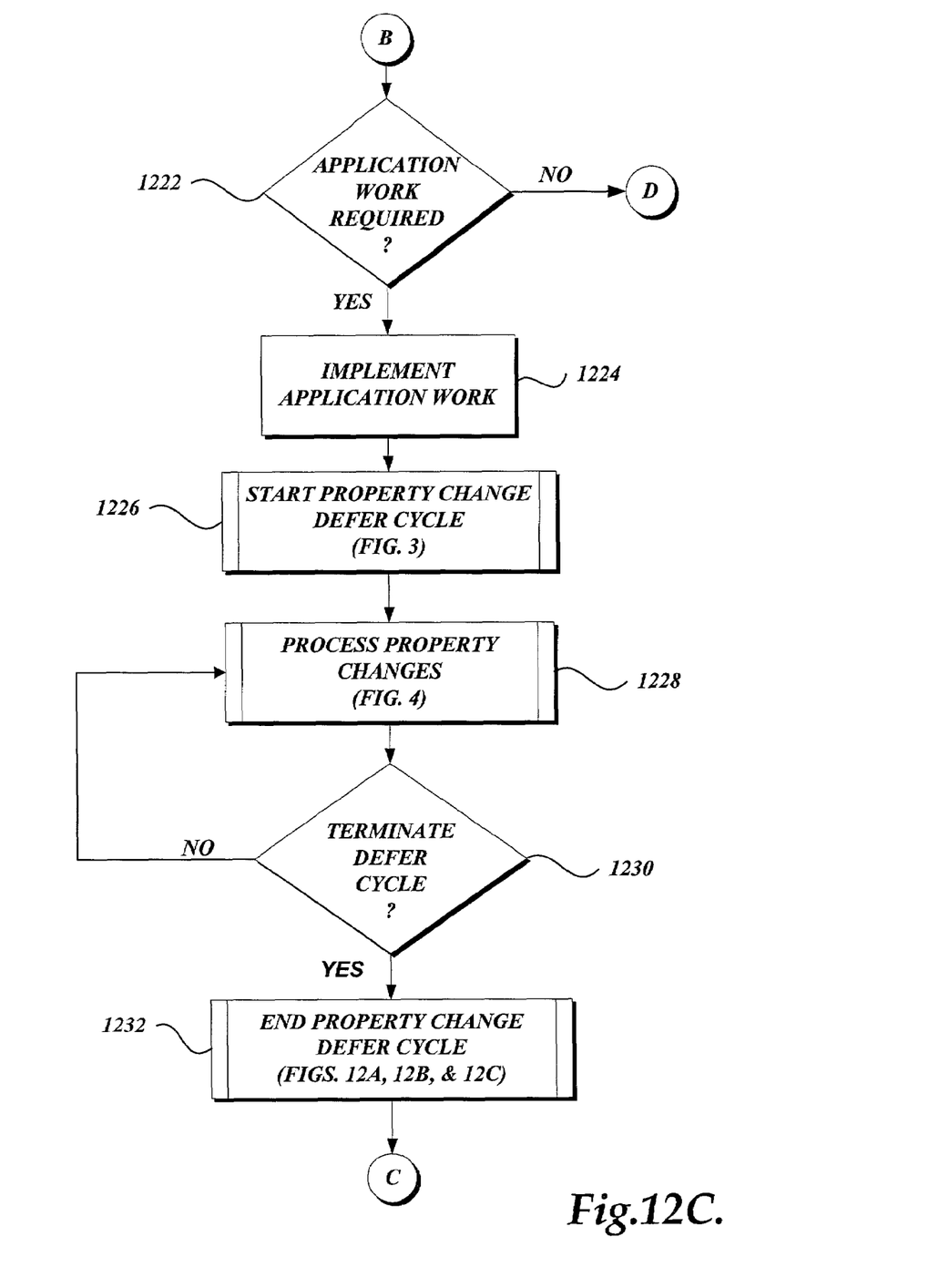

Returning to FIG. 2, once the operating system 46 determines that the end of the property change defer cycle is reached, the process 200 enters an end property change defer cycle sub-routine at block 208. FIGS. 12A, 12B, and 12C are flow diagrams of an end property change defer cycle sub-routine 1200 implemented by the operating system 46 in accordance with the present invention. Referring to FIG. 12A, at decision block 1202, a test is conducted to determine whether the reentrant counter is greater than "1". As will be explained in greater detail below, if the reentrant counter is greater than "1", the operating system 48 is processing an embedded property change defer cycle and the property changes are not implemented at this point. Accordingly, the reentrant counter is decremented at block 1204 and the sub-routine 1200 returns to block 1206. If the reentrant counter is not greater than "1", at block 1208, a pointer is set to the first element in the memory array 600.

Figure 13:
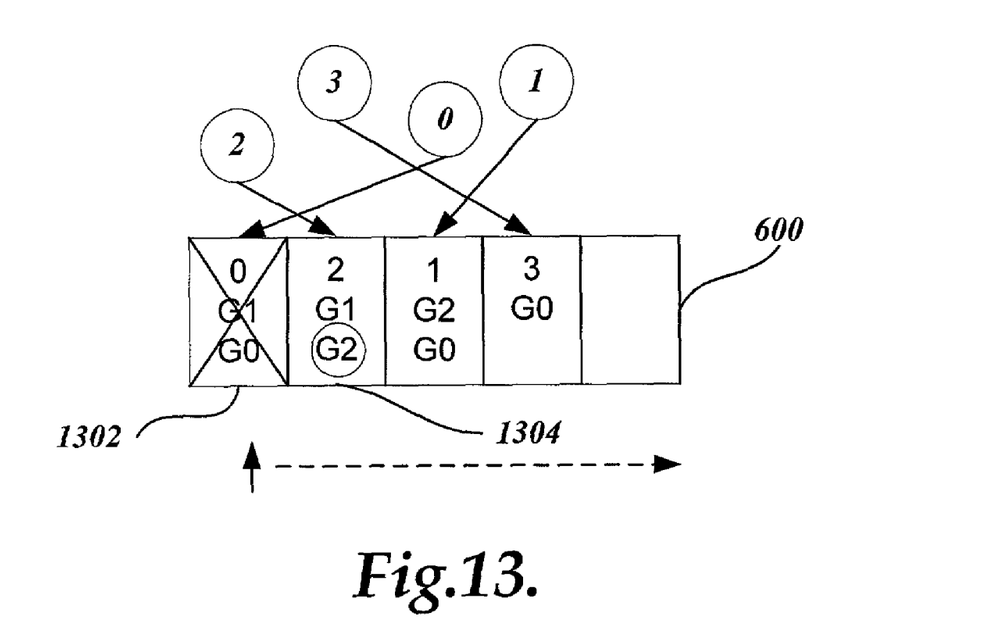
FIG. 13 is a block diagram of the memory array of FIG. 11 illustrating the implementation of group changes in accordance with the present invention.

Referring now to FIG. 12B, at decision block 1210, a test is conducted to determine whether the array element corresponding to the pointer contains a null value. If the pointer does not contain a null value, at block 1212, the group changes corresponding to the array element are implemented. FIG. 13 is a block diagram of the populated memory array 600 of FIG. 11 illustrating implementation of array element 1302 corresponding to the first array element in the memory array 600. In an actual embodiment of the present invention, the implementation of the group changes in an array element may instigate additional property changes for the specified object or other objects. For example, a change in the dimensions of a UI display object may cause additional dimension property changes in other display objects.

At block 1214, another property change defer cycle is begun. In an illustrative embodiment of the present invention, sub-routine 300 (FIG. 3), described above, is repeated for the beginning of the embedded property change defer cycle. At block 1216, the operating system 46 processes the property changes corresponding to the implementation of the property group changes in current array element of the memory array 600. With reference to FIG. 13, assume the implementation of one of the property groups in array element 1302 instigates a property change in object "2" and corresponding to property group category "G2". As described above, the process property change sub-routine 400 would include property group category "G2" in array element corresponding to object "2," illustrated in array element 1304.

At decision block 1218, a test is done to determine whether the end of the property change defer cycle has been reached. In an illustrative embodiment of the present invention, the end of an embedded property change defer cycle may be reached upon the implementation of all the property group change categories in the current array element of the memory array 600. Alternatively, the property change defer cycle may be reached upon instruction from the application program 48 or as otherwise determined by the operating system 46.

If the end of the property change defer cycle has not been reached, the process 1200 returns to block 1216. If the end of the property change defer cycle has been reached, at block 1220, the end property change defer sub-routine 1200 is entered. One skilled in the relevant art will appreciate that property changes created as a result of the implementation of a group change can also be included in the groupings stored in the memory array. Accordingly, by entering into a second property change defer cycle, an embedded property change defer cycle is commenced and the reentrance counter is incremented. In illustrative embodiment, the reentrance counter is set to "2". Additionally, in the end property change defer sub-routine, because the reentrance counter is greater than the "1", the reentrance counter is decremented and the embedded property change defer cycle terminates.

Figure 14:
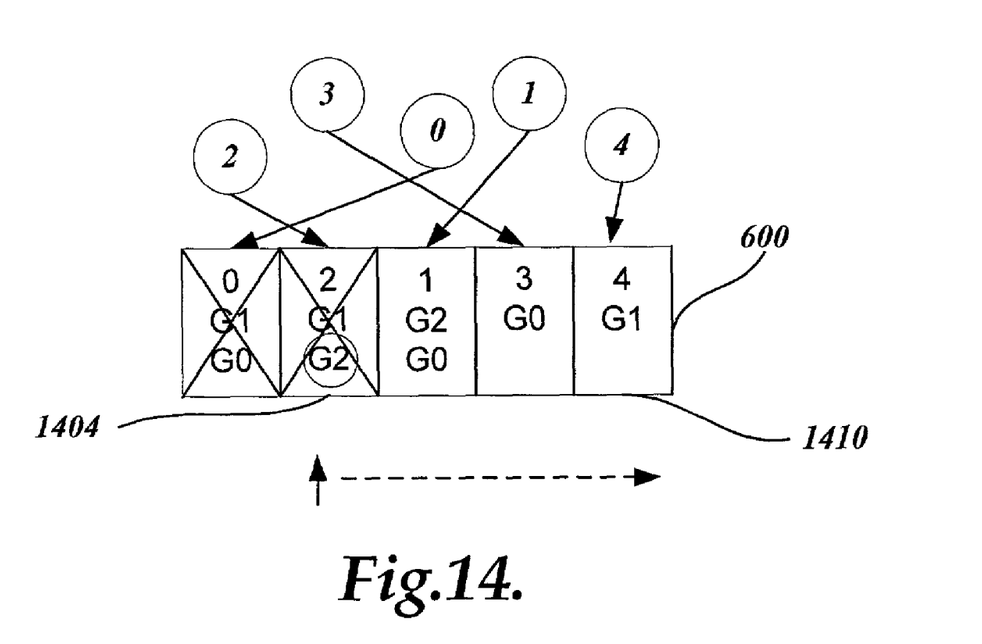
FIG. 14 is a block diagram of the memory array of FIG. 11 illustrating the generation of additional property changes during the implementation of group changes in accordance with the present invention.

Upon the completion of the embedded property change defer cycle, the sub-routine 1200 returns to decision block 1210 to determine whether the next array element contains a null value. If the next array element does not contain a null value, the sub-routine 1200 continues to implement the property group changes in the next array element and enter into additional embedded property change defer cycles. FIG. 14 is a block diagram of the memory array 600 of FIG. 11 illustrating the implementation of the second array element 1404. In an illustrative embodiment, assume the implementation of the property group category of array element 1404 creates a property change for an object "4". In accordance with the present invention, operating system 46 would process an embedded property change defer cycle, as illustrated in FIGS. 3 and 4, resulting in the addition of a new array element 1410 corresponding to object "4".

With reference to FIG. 12C, once the pointer reaches an array element containing a null value, at decision block 1210, at decision block 1222, a test is conducted to determine whether the software application program 48 is required to do any work. In an illustrative embodiment of the present invention, decision block 1222 allows the software application to intervene prior to implementing the group changes. For example, assume the group changes queue changes the affects the layout other objects within the display screen. The software application program 48 may want to queue a reconfiguration of other objects prior to implementing the group changes. If the software application 48 does not require additional work, the sub-routine proceeds to block 1204 (FIG. 12A) and the reentrant counter is decremented. The sub-routine 1200 returns to block 208 (FIG. 2), where routine 200 terminates.

If the application requires additional work, at block 1224, the application work is performed. In an illustrative embodiment of the present invention, the performance of the application work creates a list of property group changes that may need to be implemented. At block 1226, operating system generates another start property change defer cycle. In an illustrative embodiment of the present invention, the operating system 46 utilizes the sub-routine 300, described above, to begin the start property change defer cycle. At block 1228, the operating system 46 processed the property changes. In an illustrative embodiment of the present invention, the operating system 46 utilizes the process property changes sub-routine 400, described above.

At decision block 1230, a test is done to determine whether the end of the property change defer cycle has been reached. In an illustrative embodiment of the present invention, the end of the property change defer cycle may be reached once all the property changes created as a result of the additional software application work have been implemented. Alternatively, the end of the property change defer cycle may be reached as specified by the software application program 48 or the operating system 46. If the end of the property change defer cycle has not been reached, the process 1200 returns to block 1228. If the end of the property change defer cycle has been reached, at block 1232, the operating system 46 terminates the property change defer cycle. In an illustrative embodiment of the present invention, the operating system utilizes the end property change defer sub-routine 1200, described above. The process 1200 returns to decision block 1210 (FIG. 12B) so that the property changes corresponding to the additional work by the software application program 48 can be implemented.

The present invention facilitates the grouping of property changes that may affect one or more objects. By creating a property change defer cycle prior to implementing the display changes, application specific work may be consolidated such that all the work can be implemented at one time. It will be appreciated by one skilled in the relevant art that use of the start property change defer, terminate property change defer cycle and end property change defer processes are up each software application utilizing the property grouping invention.

While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. A method for processing display object property changes, the method comprising:
    obtaining a request to process at least one display object property change, the request corresponding to a software application display object;
    initiating a first property change defer cycle;
    processing the at least one display object property change;
    initiating a second property change defer cycle;
    processing any additional display property changes corresponding to the implementation of the property changes obtained in the property change request;
    determining the end of the second property change defer cycle;
    determining the end of the first property change defer cycle; and
    implementing the processed at least one display object property change upon the determination of the end of the first property change defer cycle.

2. The method as recited in claim 1, wherein the request to process at least one display object property change is transmitted by the software application.

3. The method as recited in claim 1, wherein the request to process at least one display object property change includes obtaining a request to process multiple display property changes.

4. The method as recited in claim 1, wherein initiating the property change defer cycle includes incrementing a property change defer cycle counter.

5. The method as recited in claim 1, wherein processing the at least one display object property change includes associating a property change group category to the at least one object property change.

6. The method as recited in claim 1, wherein processing the at least one display object property change includes generating a property change group memory array, the property change group memory array including array elements corresponding to a display object associated with the property change request.

7. The method as recited in claim 6, wherein processing the at least one display object property change includes populating the property change group memory array with the property change group category associated with the at least one display object property change.

8. The method as recited in claim 6, wherein processing the at least one display object property change includes populating the property change group memory array with every object property change obtained in the property change request.

9. The method as recited in claim 1, wherein processing the at least one display object property change includes identifying additional property changes corresponding to the implementation of the property changes obtained in the property change request.

10. The method as recited in claim 1 further comprising prior to determining the end of the property change defer cycle:
    determining whether additional software application work is required;
    if additional software application work is required, initiating a third property change defer cycle;
    processing any additional property changes corresponding to the implementation of the additional software application work; and
    determining the end of the third property change defer cycle.

11. The method as recited in claim 1, wherein determining the end of the property change defer cycle includes obtaining a request from the software application to terminate the property change defer cycle.

12. The method as recited in claim 1, wherein determining the end of the property change defer cycle includes the expiration of a defined time period.

13. The method as recited in claim 1, wherein the request to process at least one object property change includes a request to process at least one software application user interface object.

14. A computer system having a processor, a memory and an operating environment, the computer system operable for performing the method recited in claim 1.

15. In a computer system having a display, a memory including at least one software application, and an operating environment, a method for processing display object property changes, the method comprising:
    obtaining a request from the software application to process at least one object property change corresponding to a display object associated with the software application;
    initiating a first property change defer cycle;
    associating a property change group category to the at least one object property change;

identifying additional display object property changes corresponding to the implementation of the at least one object property change;

initiating a second property change defer cycle;

processing any additional property changes corresponding to the implementation of the at least one object property change;

determining the end of the second property change defer cycle;

determining the end of the first property change defer cycle; and implementing the processed property changes upon the determination of the end of the first property change defer cycle.

16. The method as recited in claim 15, wherein the request to process at least one object property change corresponding to a display object includes obtaining a request to process multiple property changes corresponding to a display object.

17. The method as recited in claim 15, wherein the request to process at least one object property change corresponding to a display object includes obtaining a request to process multiple property changes corresponding to multiple display objects.

18. The method as recited in claim 15, wherein initiating the property change defer cycle includes incrementing a property change defer cycle counter.

19. The method as recited in claim 15 further comprising:

generating a property change group memory array, the property change group memory array including array elements corresponding to an object associated with the property change request; and populating the property change group memory array with the property change group category associated with the at least one object property change.

20. The method as recited in claim 19, wherein populating the property change group memory array includes populating the property change group memory array with every object property change obtained in the property change request.

21. The method as recited in claim 15 further comprising prior to deter the end of the property change defer cycle:

determining whether additional software application work is required;

if additional software application work is required, initiating a third property change defer cycle;

processing any additional property changes corresponding to the implementation of the additional software application work; and determining the end of the third property change defer cycle.

22. The method as recited in claim 15, wherein determining the end of the property change defer cycle includes obtaining a request from the software application to terminate the property change defer cycle.

23. The method as recited in claim 15, wherein determining the end of the property change defer cycle includes the expiration of a defined time period.

24. The method as recited in claim 15, wherein the request to process at least one object property change corresponding to a display object includes a request to process at least one software application user interface display object.

25. A computer system having a processor, a memory and an operating environment, the computer system operable for performing the method recited in claim 15.

26. A method for professing object property changes, the method comprising:

obtaining a request to process at least one object property change, the request corresponding to a software application object;

initiating a first property change defer cycle;

generating a property change group memory array, the property change group memory array including array elements corresponding to an object associated with the property change request;

populating the property change group memory array with a property change group category associated with the at least one object property change;

for each memory array element, identifying additional display object property changes corresponding to the implementation of the at least one object property change;

initiating a second property change defer cycle;

processing any additional property changes corresponding to the implementation of the at least one object property change;

determining the end of the second property change defer cycle;

determining the end of the first property change defer cycle; and implementing the processed at least one object property change upon the determination of the end of the first property change defer cycle.

27. The method as recited in claim 26, wherein the request to process at least one object property change is transmitted by the software application.

28. The method as recited in claim 26, wherein the request to process at least one object property change includes obtaining a request to process multiple property changes.

29. The method as recited in claim 26, wherein initiating the property change defer cycle includes incrementing a property change defer cycle counter.

30. The method as recited in claim 26 further comprising prior to determining the end of the property change defer cycle:

determining whether additional software application work is required;

if additional software application work is required, initiating a third property change defer cycle;

processing any additional property changes corresponding to the implementation of the additional software application work; and determining the end of the third property change defer cycle.

31. The method as recited in claim 26, wherein determining the end of the property change defer cycle includes obtaining a request from the software application to terminate the property change defer cycle.

32. The method as recited in claim 26, wherein determining the end of the property change defer cycle includes the expiration of a defined time period.

33. The method as recited in claim 26, wherein the request to process at least one object property change includes a request to process at least one software application user interface object.

34. A computer system having a processor, a memory and an operating environment, the computer system operable for performing the method recited in claim 26.

* * * * *